United States Patent
Schoen et al.

(10) Patent No.: US 10,086,943 B2
(45) Date of Patent: Oct. 2, 2018

(54) SYSTEM FOR MOVING LOADS COMPRISING A DRIVEN TRANSPORT VEHICLE

(71) Applicant: Airbus Operations GmbH, Hamburg (DE)

(72) Inventors: Hans Joachim Schoen, Hamburg (DE); Sascha Nowarre, Hamburg (DE); Patrick Dittmer, Heinbockel (DE); Nils Hendrik Hoppe, Oyten (DE); Thies Andreas Ernst-Friedrich Beinke, Bremen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/583,055

(22) Filed: May 1, 2017

(65) Prior Publication Data

US 2017/0313423 A1  Nov. 2, 2017

(30) Foreign Application Priority Data

May 2, 2016  (DE) .................. 10 2016 207 513

(51) Int. Cl.
*B64D 9/00* (2006.01)
*B65G 39/02* (2006.01)
*B65G 39/18* (2006.01)

(52) U.S. Cl.
CPC ........... *B64D 9/003* (2013.01); *B65G 39/025* (2013.01); *B65G 39/18* (2013.01); *B64D 2009/006* (2013.01); *B65G 2207/34* (2013.01)

(58) Field of Classification Search
CPC ......... B65G 25/10; B65G 67/02; B65D 19/38
(Continued)

(56) References Cited

U.S. PATENT DOCUMENTS

| 4,170,292 A | 10/1979 | Lang |
| 4,981,209 A | 1/1991 | Sogge |

(Continued)

FOREIGN PATENT DOCUMENTS

| DE | 2735737 | 2/1979 |
| DE | 102005030058 | 1/2007 |

(Continued)

OTHER PUBLICATIONS

German Search Report, dated Feb. 14, 2017, priority document.

*Primary Examiner* — Gene O Crawford
*Assistant Examiner* — Lester III Rushin
(74) *Attorney, Agent, or Firm* — Greer, Burns & Crain, Ltd.

(57) ABSTRACT

A system for moving loads comprising a cargo compartment floor, at least one roller track comprising rollers arranged one behind the other in the cargo compartment floor, at least one guideway in the floor and extending parallel to the at least one track, and at least one transport vehicle removably accommodated in and movable along the guideway. The transport vehicle comprises at least one connecting element movable between first and second operating positions. In the first operating position, the connecting element is configured so the transport vehicle is positionable beneath a load on the roller track, and in the second operating position, the connecting element is configured to interact with the load to connect the load to the transport vehicle, so the load is entrained when the transport vehicle moves along the guideway. The transport vehicle further comprises a drive mechanism to move the transport vehicle along the guideway.

15 Claims, 8 Drawing Sheets

(58) Field of Classification Search
USPC .................................. 198/746, 793; 414/392
See application file for complete search history.

(56) References Cited

U.S. PATENT DOCUMENTS

| | | | | |
|---|---|---|---|---|
| 6,547,061 | B2* | 4/2003 | Gasal | B64C 1/20 |
| | | | | 198/746 |
| 7,785,056 | B2* | 8/2010 | Sanford | B64D 9/00 |
| | | | | 414/392 |
| 9,156,553 | B1 | 10/2015 | Johnson et al. | |
| 2006/0065786 | A1 | 3/2006 | Huber et al. | |
| 2006/0291983 | A1 | 12/2006 | Konig et al. | |
| 2007/0221102 | A1* | 9/2007 | Reinhall | B65D 19/0073 |
| | | | | 108/57.12 |
| 2009/0304482 | A1 | 12/2009 | Sanford et al. | |
| 2014/0255137 | A1 | 9/2014 | Haertel et al. | |
| 2015/0225082 | A1 | 8/2015 | Levron | |
| 2016/0318608 | A1 | 11/2016 | Himmelmann | |

FOREIGN PATENT DOCUMENTS

| | | |
|---|---|---|
| DE | 102013003849 | 9/2014 |
| EP | 1527993 | 5/2005 |
| EP | 3006329 | 4/2016 |
| WO | 2014049590 | 4/2014 |

\* cited by examiner

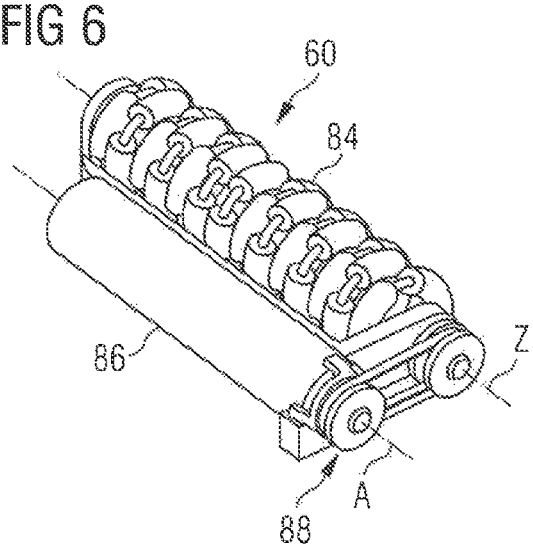
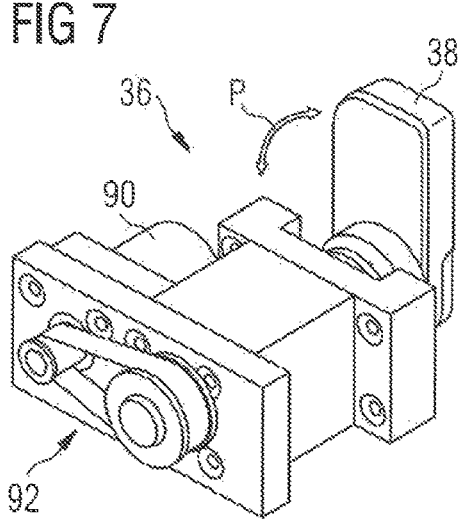
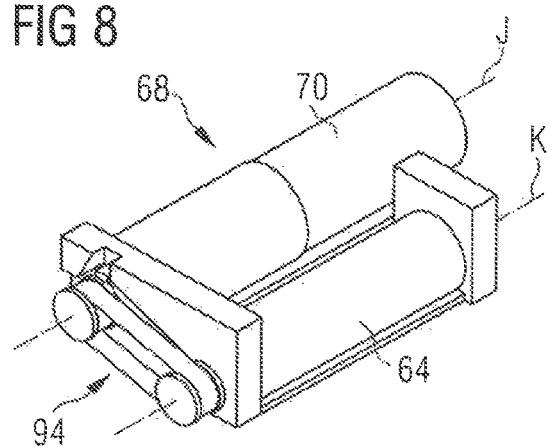

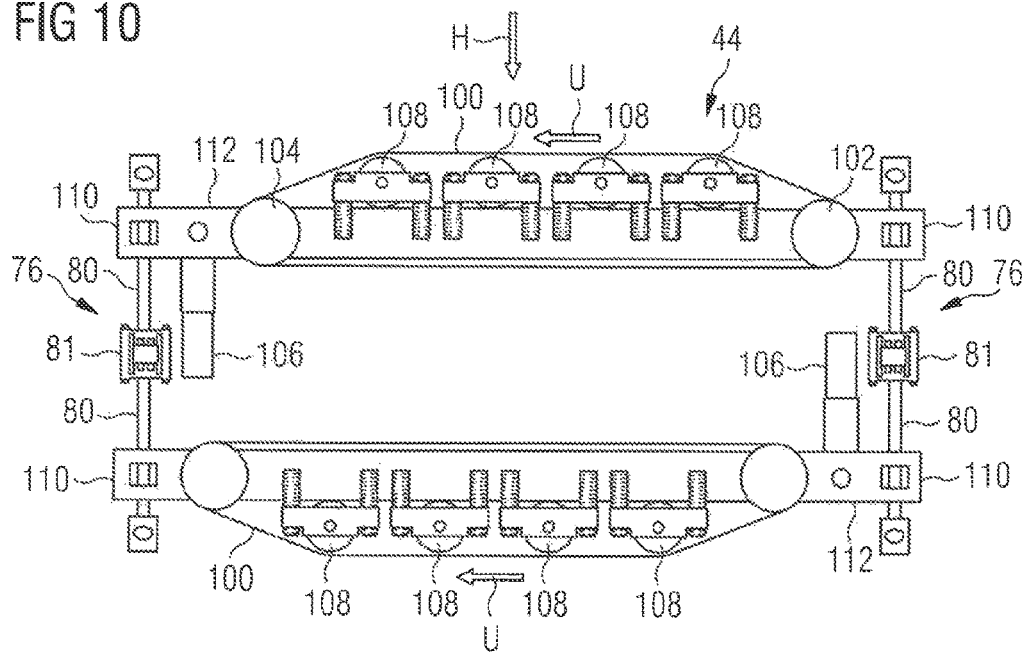
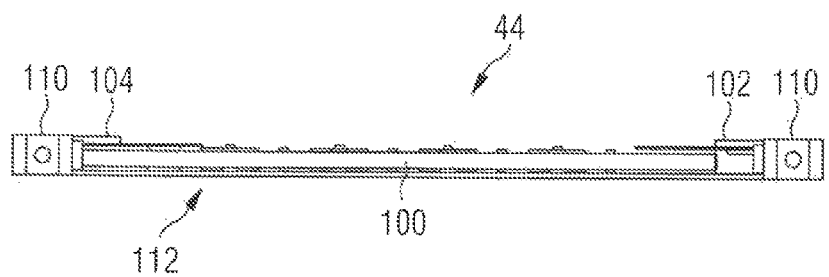

SYSTEM FOR MOVING LOADS COMPRISING A DRIVEN TRANSPORT VEHICLE

CROSS-REFERENCES TO RELATED APPLICATIONS

This application claims the benefit of the German patent application No. 10 2016 207 513.6 filed on May 2, 2016, the entire disclosures of which are incorporated herein by way of reference.

BACKGROUND OF THE INVENTION

The invention relates to a system for moving loads, which is suitable in particular for use in a cargo compartment of an aircraft. The invention also relates to a cargo compartment equipped with such a system, and to the use of such a system and/or cargo compartment in an aircraft.

Loads to be transported in cargo or passenger aircraft are usually stored in standardized containers or on standardized pallets, known as unit load devices (ULDs). To be able to displace the ULDs in the cargo compartment, roller tracks are usually integrated into a floor of the cargo compartment, which, depending on the design, allow the ULDs to be moved in a directionally dependent or directionally independent manner. A cargo compartment equipped with such roller tracks is described in EP 1 527 993 B1, for example. The ULDs can be displaced manually on the roller tracks. Alternatively, an electric drive system comprising power drive units (PDUs) can be provided in or next to the roller tracks, allowing the ULDs to be displaced automatically in the cargo compartment.

As an alternative or in addition to potential PDUs, it is furthermore known to provide transport vehicles that enable a displacement of the ULDs along the roller tracks and parallel to the cargo compartment floor. Such transport vehicles essentially only absorb the reaction forces or forces of inertia that occur during the displacement of the ULDs, while the considerably higher gravitational forces are borne by the roller tracks.

Such a solution is known from DE 10 2013 003 849 A1, for example, in which a transport vehicle is positioned beneath a load arranged on the roller tracks. Thereafter, a platform of the transport vehicle is raised so as to establish contact with the load and enable a displacement. Furthermore, from U.S. Pat. No. 4,170,292 A and DE 2 735 737 A1, transport vehicles displaceable by way of external cable winches are known, which can selectively be brought in contact with a load arranged on the roller tracks so as to displace the load parallel to the cargo compartment floor.

SUMMARY OF THE INVENTION

It is an object of the invention to provide a system for moving loads, which allows economical operation and as efficient loading and unloading of loads as possible.

The solution according to the invention is described hereafter in particular with reference to a possible application in an aircraft. However, it is also conceivable to use the system in a stationary storage area, such as a warehouse.

A system for moving loads comprises a cargo compartment floor. This floor may comprise all suitable materials that withstand the gravitational forces of the loads, such as metal, plastic or composite materials. The loads may comprise standardized containers or pallets in the form of ULDs, but also any other item for transport.

The system furthermore comprises at least one roller track, which comprises a plurality of rollers arranged one behind the other in the cargo compartment floor. The roller track may be configured to allow the movement of a load in a direction parallel to the surface of the cargo compartment floor. The rollers of the at least one roller track may take on any shape, such as a cylindrical shape or a spherical shape. Furthermore, they may be mounted in such a way that a load arranged thereon can be moved in a direction parallel to the surface of the cargo compartment floor. The rollers of the at least one roller track are preferably dimensioned in such a way that a load arranged thereon is arranged at a sufficient distance from the surface of the cargo compartment floor to allow a frictionless displacement of the load parallel to the surface of the cargo compartment floor.

When the system is used in an aircraft, the at least one roller track and/or the rollers arranged therein may furthermore be arranged in such a way that, in particular, a displacement of loads along a cargo compartment or aircraft longitudinal axis is made possible. Correspondingly, the rollers of the roller track may, in general, be arranged one behind the other along a cargo compartment or aircraft longitudinal axis.

Furthermore, at least one guideway is provided in the cargo compartment floor. The guideway extends substantially parallel to the at least one roller track. The roller track and the guideway may take on any desired rectilinear or curved shape. In particular, when the system is used in an aircraft, the roller track and/or the guideway may extend in a substantially rectilinear manner so as to enable a rectilinear movement of the loads parallel to the roller track and guideway. In a preferred embodiment, the guideway is delimited by two adjoining and substantially parallel roller tracks, which is to say the guideway is arranged between the side wall regions of two adjoining roller tracks and is defined by the same.

The guideway may, in general, comprise a base region, which may comprise a planar base surface and may extend substantially parallel to a surface of the cargo compartment floor and/or a movement plane of the load defined by the roller track. The base region may establish a movement plane of a transport vehicle described hereafter. The guideway may furthermore comprise side wall regions, which may extend substantially parallel to one another and/or are arranged at an angle to the base region, which is preferably approximately 90°. The side wall regions may furthermore extend substantially parallel to a movement axis of the transport vehicle and/or be defined by the side walls of adjoining roller tracks.

The guideway may, in general, comprise the same materials as the cargo compartment floor, and, in particular, materials that allow a, preferably, low-loss movement of the transport vehicle along the guideway, such as metal, plastic or composite materials.

The system for moving loads, furthermore, comprises at least one transport vehicle that is removably accommodated in the guideway and movable along the guideway. The term "removably" may, in particular, refer to the option of simply taking the transport vehicle out of, or removing the transport vehicle from, the guideway and, preferably, includes cases in which the transport vehicle can be removed from the guideway without additional disassembly steps on the transport vehicle and/or the guideway (which is to say, can be removed without disassembly). For example, it may be provided to enable a removal from the guideway by a simple automatic or manual shift of retaining or guide elements of the transport vehicle (such as possible guide rollers described hereafter), without such elements having to be completely disassembled from the transport vehicle.

As a result, the transport vehicle can thus be arranged in the guideway with low complexity so as to carry out a loading and/or loading operation of the cargo compartment. For maintenance purposes and/or when such loading operations are completed, the vehicle can be removed from the guideway again.

The transport vehicle, in general, allows loads to be moved efficiently, whereby rapid loading and unloading of a cargo compartment is made possible. Likewise, the transport vehicle can partially or completely replace driven rollers (PDUs) provided for the purpose of moving the load, whereby the costs and the total weight can be reduced. Instead, the transport vehicle can simply be inserted into the guideway as needed, and removed therefrom again after the loads have been moved, so that the weight of the overall system is not unnecessarily increased. However, it is likewise conceivable to leave the transport vehicle, preferably, permanently in the guideway. In the case of a use in an aircraft, this makes it possible, for example, to start the unloading operation immediately after landing. The use of the driven and guideway-bound transport vehicle according to the invention offers considerable weight advantages over PDUs distributed across a large area in the cargo compartment, even when left permanently in the guideway or "flying along."

In this connection, the guideway allows the transport vehicle to be moved quickly and reliably, and in a standardized manner, along a preferred movement axis or path. Furthermore, the guideway provides a free space in which the transport vehicle can be arranged and move, and can be positioned beneath a load on the roller track even when designed to have a certain height. This increases the configuration freedom in the design of the transport vehicle, which can thus additionally be optimized in terms of weight, technical function and cost.

The transport vehicle furthermore comprises at least one connecting element, which is movable between a first operating position and a second operating position. The connecting element preferably is movable between the first and second operating positions in a direction that extends substantially perpendicular to the surface of the cargo compartment floor. For example, the connecting element can be moved, and preferably rotated, between the first and second operating positions in a plane which extends at an angle and, in particular, substantially perpendicularly to the surface of the cargo compartment floor.

In the first operating position, the connecting element is arranged in such a way that the transport vehicle accommodated in the guideway is positionable beneath a load arranged on the at least one roller track. In other words, it may be provided that the connecting element, in the first operating position thereof, does not protrude significantly from the guideway and beyond the cargo compartment floor. Instead, it can be arranged so as to be positioned substantially beneath a plane that is defined by an upper running surface plane of the rollers of the roller track, and that serves as a support surface for the loads and/or defines a movement plane of the loads. Consequently, the transport vehicle accommodated in the guideway can be arranged beneath a load arranged on the roller track.

In the second operating position, in contrast, the connecting element is arranged so as to interact with the load in order to connect the load to the transport vehicle, so that the load is entrained when the transport vehicle moves along the guideway. Correspondingly, in the second operating position, the connecting element can protrude from the guideway and beyond the above-described running surface plane of the rollers of the roller track so as to interact with a load arranged thereon. For example, direct or indirect contact or a coupling can be established between the connecting element and the load, so that a movement of the transport vehicle along the guideway is transmitted via the connecting element to the load. In this way, the load can be moved together with the transport vehicle along the guideway and parallel to a surface of the cargo compartment floor.

Since the load is able to be supported on the roller track, the transport vehicle does not have to be designed to carry the full weight of the load. The transport vehicle can thus have a lighter and more cost-efficient design.

For example, the connecting element may be designed as a pressure plate, which is configured to press preferably against a bottom surface of the load in the second operating position so as to establish frictional forces, and thereby transmit a movement force of the transport vehicle to the load. This is advantageous to the effect that the transport vehicle can interact with many different loads with low complexity, without requiring specific measures to the load and/or the transport vehicle for this purpose, for example within the meaning of standardized connecting points.

In a preferred embodiment, however, the connecting element is designed in such a way that at least a first section of the connecting element, in the second operating position thereof, extends from the transport vehicle in the direction of the load so as to establish a connection between the load and the transport vehicle. This makes it possible for a pushing force to be transmitted particularly reliably to the load when the transport vehicle moves in the guideway. For example, in this way a (direct or indirect) form fit can be established between the load and the transport vehicle, as viewed along the movement axis of the transport vehicle.

For this purpose, the first section of the connecting element may, in particular, interact with a side wall region of the load, which extends at an angle from a bottom region of the load facing the roller track. The side wall region may also include a lower edge region of the load (for example, in the form of a transition region between the side wall and the bottom). In the second operating position, the first section may extend substantially perpendicularly to a movement plane of the transport vehicle and/or a surface of the transport vehicle facing the load. This enables a particularly reliable interaction with a side wall region of the load. The first section of the connecting element may furthermore have a plate-shaped design so as to provide a sufficient bearing surface against the load, and preferably against the side wall region thereof.

According to a further embodiment, the connecting element of the transport vehicle comprises a second section, which is arranged at an angle, and preferably substantially perpendicularly, to the first section. This makes it possible for the first and second sections, in the second operating position of the connecting element, to be configured to interact with a lower edge region of the load, and to preferably surround the same.

The transport vehicle may, in general, comprise a plurality of connecting elements, which are arranged and distributed on the transport vehicle so as to be able to interact with predetermined regions of a load to be accommodated.

The transport vehicle furthermore comprises a drive mechanism for moving the transport vehicle along the guideway. The movement of the transport vehicle preferably takes place in both directions along a movement axis, which essentially follows the progression of the guideway. In other words, the drive mechanism can enable an autonomous or automatic movement of the transport vehicle, without manual assistance being absolutely required, such as manual pushing. Due to the drive mechanism being provided directly on the transport vehicle, possibly required adjustments in the cargo compartment, and, in particular, of the guideway for moving the transport vehicle, can be decreased, and possibly even entirely dispensed with. The retrofit complexity for subsequently equipping a cargo compartment with the system according to the invention can thus be reduced.

The transport vehicle may comprise an electric motor, which, in general, allows a reliable and precisely predefinable movement of the transport vehicle at a reduced size and weight. For this purpose, the electric motor may obtain current from a suitable rechargeable battery for the storage of electrical energy, for example a battery that, preferably, is likewise arranged in the transport vehicle and is moved together with the same. As an alternative or in addition, it may be provided that the electric motor obtains energy via a non-contact current transmission system, which may at least partially be arranged in the guideway.

According to one refinement, the drive mechanism comprises at least one driven drive roller, which interacts with the guideway and which, preferably, interacts with a base region of the guideway. For this purpose, the roller may bear directly against the base region or a planar base surface of the guideway and roll thereon in the known manner to generate a movement of the transport vehicle. The drive roller is, preferably, arranged on a lower face of the transport vehicle.

Within the meaning of the invention, the term "roller" can, in general, also be understood to mean disk-shaped, thin-walled wheels or spheres. The rollers may also, in general, be cylindrical, conical, barrel-shaped or have a variable diameter along the rotational axis thereof. According to a preferred variant and, in particular, in connection with possible drive rollers, however, it is provided that a length of the rollers along the (main) rotational axis thereof exceeds a maximum and/or averaged roller diameter along this length. This allows a load introduction into adjoining areas across a large surface area, and thus at a lower impact on the structure, while achieving a flat design of the rollers. In a preferred variant, the length of the drive roller along the rotational axis thereof is between 1.5 and 8 times the size of the (maximum or averaged) roller diameter, and preferably between 1.5 and 5 times the size, or between 2 and 4 times the size, wherein the drive roller preferably is cylindrical.

The drive roller may, in general, be driven by a central drive unit of the transport vehicle, such as an electric motor driving multiple drive rollers. For this purpose, appropriate gearbox devices and drive trains may be provided between the central drive unit and the drive rollers.

The drive roller may be an integral part of a drive unit of the drive mechanism. The drive unit may, in general, be designed as a module that can be handled separately. According to a preferred variant, the transport vehicle comprises a drive mechanism having multiple separate drive units, which are distributed along the transport vehicle. The drive unit furthermore may comprise an electric motor driving the drive roller. Correspondingly, it may be provided that multiple individual drive unit modules are arranged in different positions of the transport vehicle, or distributed along the transport vehicle, wherein the drive units each comprise an above-described drive roller and an electric motor driving the drive roller. This allows each drive roller to be individually activated with precision so as to move the transport vehicle along the guideway and/or correct an orientation of the transport vehicle. Furthermore, this solution allows the size and the weight of the transport vehicle to be reduced since the drive units can have a comparatively compact and flat design.

In this connection, it may furthermore be provided that the electric motor comprises an output shaft, and that a rotational axis of the output shaft and a rotational axis of the drive roller extend substantially parallel to one another. The output shaft can transmit torque generated by the electric motor to the elements coupled to the output shaft in the known manner. By orienting the output shaft axis parallel to the drive roller axis, these units may be arranged at a substantially identical height with respect to the guideway and/or be offset only slightly relative to one another. In this way, a particularly flat design of the drive unit can be achieved, whereby the overall size of the transport vehicle can be reduced.

Furthermore, it may be provided that the electric motor and the drive roller are coupled to one another via a belt drive. This may also allow the size of the drive unit to be reduced, in particular, compared to a coupling via gear wheels, which must be dimensioned with comparatively large diameters even when the distances between the output shaft and the drive roller are small. Wheels may be provided in the variant comprising the belt drive, which are coupled to an output shaft of the electric motor and to the drive roller in the known manner and over which a drive belt is guided. The belt drive may likewise be guided directly over appropriately designed regions of the output shaft and/or drive roller. The drive belt may, in general, be designed as a toothed belt, V-belt, flat belt or the like.

In general, the transport vehicle may comprise a front region and a rear region, as viewed along a movement axis of the transport vehicle. The front and/or rear regions may each extend at an angle to the movement axis, and preferably may extend substantially perpendicularly thereto. The front and rear regions of the transport vehicle can be connected via appropriate side regions, which preferably extend substantially parallel to the movement axis of the transport vehicle. If the guideway is designed with the above-described side wall regions, the side regions of the transport vehicle may face or be located opposite the side wall regions of the guideway. In addition or as an alternative, the front and rear regions of the transport vehicle may extend at an angle to the side wall regions, and preferably may extend substantially perpendicularly thereto. Finally, the transport vehicle may also have an upper face, which, in general, faces a load arranged on the roller track. Likewise, a lower face may be provided, which is located substantially opposite the upper face and can face a possible base region of the guideway.

In one refinement, it is provided that the transport vehicle comprises at least two drive units, which are arranged on opposing sides of the transport vehicle, and which are, preferably, arranged in diagonally opposing corner regions of the transport vehicle. The opposing sides may be the above-described front and rear regions of the transport vehicle, or the opposing side regions thereof. The corner regions may comprise transition regions of the front and/or rear regions of the transport vehicle to the side regions thereof.

According to this variant, it can be ensured that the drive units are able to ensure a preferred orientation of the transport vehicle during a movement along the guideway. In particular, it may be provided that the drive units can be activated so as to deliberately correct an orientation of the transport vehicle. In other words, the mutually opposing drive units can be individually activated so as to exert torque on the transport vehicle, in order to rotate the same in the movement plane thereof and orient it in accordance with the intended movement axis.

Regardless of the specific design of the drive mechanism, the transport vehicle can, in general, comprise control electronics and suitable sensors for establishing a current orientation of the transport vehicle within the guideway. If the current orientation deviates from the intended movement axis, the drive mechanism may be used to take appropriate countermeasures.

One refinement provides for the transport vehicle to comprise at least one non-driven roller, which interacts with the guideway and which preferably interacts with a base region of the guideway. "Non-driven" shall, in particular, be understood to mean the absence of torque transmission to the roller, by way of which the roller could generate a locomotive force. In other words, the non-driven roller may be designed as a following roller, which assumes track-keeping and/or stabilization or support functions, for example, so as to safely move the transport vehicle along the guideway.

The transport vehicle may furthermore comprise at least one guide roller, which is preferably configured to interact with a side wall region of the guideway. Likewise, the transport vehicle may comprise at least two guide rollers, which are arranged on opposing sides of the transport vehicle (for example on the above-described side regions of the same). The guide roller may, in general, be designed to keep the orientation of the transport vehicle substantially constant during a movement along the guideway. For this purpose, the guide roller may rotate about a rotational axis, which extends at an angle to the movement plane of the transport vehicle, and preferably extends perpendicularly thereto.

Particularly precise guidance can furthermore be achieved when the guide roller is preloaded with respect to an appropriate bearing region in the cargo compartment (for example, with respect to an opposing side wall region of the guideway). For this purpose, the transport vehicle may comprise an appropriate preload mechanism, for example in the form of a spring device or a threaded spindle/nut system. The preloading may only take place after the transport vehicle has been inserted into the guideway. For this purpose, the preload mechanism may comprise activation and/or adjustment mechanisms accessible from the outside (for example, the spindle nut itself). Prior to a removal of the transport vehicle from the guideway, the preload can be similarly reduced again, without necessitating complex disassembly steps or the like.

According to a further embodiment, it may be provided that the transport vehicle comprises at least one transport device, which is designed to move a load positioned over the transport vehicle relative to the transport vehicle. For this purpose, the transport device may be at least indirectly coupled to or make contact with the load, so as to apply corresponding movement forces thereto. The transport device makes it possible, in general, that more degrees of freedom are available for moving the loads within the cargo compartment. In this way, loading and unloading operations can be designed more efficiently. It also allows the loads to be flexibly oriented in accordance with variable dimensions or loading states of the cargo compartment, even if these loads are already arranged on the transport vehicle. This is relevant, in particular, for cases in which the cargo compartment is tapered or has a drastically varying cross-section. The relative movement of the load by way of the transport device preferably takes place in states in which the load is at least partially still supported by the roller track or comparable devices in the cargo compartment floor. The relative movement to the transport vehicle can, in general, take place parallel to a movement of the transport vehicle along the guideway and/or when the transport vehicle is stopped.

In this connection, it may furthermore be provided that the transport device is designed to move the load essentially along a movement axis of the transport vehicle and/or to rotate the load relative to the transport vehicle. In other words, the transport device can, in general, provide a translatory and/or rotatory degree of freedom so as to move the load on or over the transport vehicle. The load can, in particular, be rotated about an axis that extends at an angle, and preferably substantially perpendicularly, to a movement plane of the transport vehicle and/or of the cargo compartment floor. In other words, it may be provided that the load is rotated about a vertical axis. During the movement along the movement axis, the load, in contrast, can be displaced parallel to the movement plane of the transport vehicle and/or the cargo compartment floor.

For this purpose, the transport device may comprise a conveyor belt, a rotary table, a gripper comprising appropriate kinematics or the like. According to a preferred variant, the transport device, however, comprises at least one driven transport roller. This can interact with a suitable surface area of the load and/or be brought to bear against the same, so as to transmit a movement force thereto. The transport roller may, in general, be arranged on an upper face of the transport vehicle. Furthermore, it may be arranged approximately at the same height as a running surface plane of the rollers of the roller track or a movement plane of the loads on the roller track. In this way, reliable contact with a load arranged on the roller track is ensured.

In addition or as an alternative, it may be provided that the transport roller is preloaded or that a preload force can selectively be applied thereto to ensure reliable bearing against a load positioned over the transport vehicle. The preload force may be calculated in such a way that sufficiently large frictional forces can be achieved between the load and the transport roller to transmit as large a portion of the driving force of the transport roller as possible to the load. At the same time, the preload force may be selected in such a way that the gravitational forces of the load continue to be borne primarily by the roller tracks. In a preferred variant, the transport roller is spring preloaded in the direction of a possible load positioned over the transport vehicle. In an unloaded state, the transport roller may initially also protrude beyond the running surface plane of the rollers of the roller tracks. It goes without saying that such preload devices may also be provided on transport devices that do not comprise any transport rollers.

The transport roller may comprise an omnidirectional roller or be designed as such a roller. This may be understood to mean a roller that, in addition to a base body rotating about a main rotational axis, comprises further elements that rotate about a rotational axis having a different orientation. These may be further roller elements inserted into the base body. These may rotate about an axis extending substantially perpendicularly to the main rotational axis of the base body and/or may form a running surface of the transport roller, which can be brought in contact with the load.

Such an omnidirectional roller additionally increases the freedom of movement of the load relative to the transport vehicle. This applies, in particular, when a plurality of corresponding rollers are provided, the rotational movements of which are deliberately coordinated, for example by way of a suitable control device of the transport device, so as to generate a predetermined movement of the load.

In this connection, it may furthermore be provided that the transport roller may be drivable to rotate about a rotational axis that extends at an angle to the movement axis of the transport vehicle. The rotational axis may extend substantially parallel to a movement plane of the transport vehicle and may, in general, extend at an angle of approximately 15° to 90° to the movement axis, and preferably at an angle of approximately 20° to 60°, or approximately 30° to 50°. According to one variant, the rotational axis extends at an angle of approximately 45° to the movement axis of the transport vehicle.

Due to the deliberate orientation of the rotational axis, desired movements of a load can be generated particularly quickly and precisely. When omnidirectional rollers are used, and, in particular, when multiple transport roller that are activated in a coordinated manner are used, additionally frictional losses between the load and the transport roller and/or within the transport device can be reduced by way of an appropriate orientation of the rotational axis. This applies, in particular, to frictional losses within potential omnidirectional rollers that arise in connection with the elements inserted therein and rotating about different axes. Minimizing such losses means that battery capacities can be saved, whereby the overall weight of the system can be reduced.

According to one variant, at least two transport rollers may be provided, having rotational axes that extend at an angle to the movement axis of the transport vehicle and at an angle with respect to one another (which is to say that do not extend parallel to one another). For example, the rotational axes may enclose an angle of approximately 60° to 120°, and preferably of approximately 90°. In the latter case, the rotational axis of a first transport roller may extend at an angle of approximately +45° to the movement axis, and the second rotational axis may extend at an angle of approximately −45°.

In general, it is also possible for multiple groups of transport rollers to be provided on the transport vehicle, for example a first group that is primarily used to generate a translatory movement relative to the vehicle, and a second group that, among other things, enables a rotation of the load.

A refinement provides for the transport vehicle to comprise individual modules that can be detached from one another, and for each individual module to comprise at least one of the following features: a drive mechanism according to one of the above-described aspects, a non-driven roller according to one of the above-described aspects, a guide roller according to one of the above-described aspects, a transport device according to one of the above-described aspects and a connecting element according to one of the above-described aspects. This makes it possible to adapt the transport capacity of the transport vehicle as needed to the loads to be transported. Furthermore, the individual modules may be dimensioned so as to be easily removable manually from the guideway or insertable therein, which can preferably be carried out by a single operator. Overall, the flexibility, handling and ease of maintenance of the system can thus be increased.

In general, the (maximum or averaged) diameter of the driver rollers or of the transport rollers can furthermore exceed the (maximum or averaged) diameter of the respective associated electric motors. This allows a particularly space-saving arrangement in the transport vehicle.

In general, it may be provided that the system according to the invention comprises at least two guideways having transport vehicles arranged therein. The guideways may extend parallel to one another, and the movement axes of the transport vehicles may likewise be oriented parallel to one another. Furthermore, at least one roller track may be assigned to each guideway. The transport vehicles may be moved independently of one another and/or coordinated with one another, and preferably uniformly. For example, the transport vehicles may always be moved from a shared starting position forward and backward by identical distances along the movement axes thereof. This can take place by way of a suitable control unit of the system, which outputs appropriate control commands and preferably monitors and/or corrects the movements of the transport vehicles. The transport vehicles may also comprise respective dedicated control devices, which may suitably communicate with one another and/or with a higher-level control device of the system.

In the variant comprising multiple transport vehicles, all integral parts of the system, including the transport vehicles themselves, may be designed according to one of the above-described aspects. In particular, it may be provided that the transport vehicles each comprise suitable transport devices, wherein the transport devices may also be activated in a coordinated manner with respect to one another, so as to generate a predetermined movement, and in particular a rotation of a shared load arranged over the transport vehicles. This is relevant, in particular, for cases in which large loads are to be moved that extend across multiple transport vehicles.

Finally, according to an alternative variant, it may be provided that the drive mechanism comprises a belt drive. This drive may comprise a revolving drive belt, which may preferably be brought to bear against a side wall region of the roller track so as to generate an advancement force for moving the transport vehicle according to the principle of a chain or crawler drive. The transport vehicle may comprise appropriate drive belts on either side of the opposing side regions. Furthermore, the drive belts may n be preloaded via a suitable preload mechanism, such as a threaded spindle/nut system, so as to ensure a sufficient bearing force against the side wall regions.

The invention furthermore relates to a cargo compartment, comprising a system for moving loads according to one of the above-described aspects. The invention also relates to the use of a system for moving loads and/or a cargo compartment according to one of the above-described aspects in an aircraft.

BRIEF DESCRIPTION OF THE DRAWINGS

Preferred embodiments of the invention will be described in more detail hereafter based on the accompanying drawings. In the drawings:

FIG. 6 shows a transport device of the transport vehicle from FIG. 3 in a perspective single representation;

FIG. 7 shows a connecting unit of the transport vehicle from FIG. 3 in a perspective single representation;

FIG. 8 shows a drive unit of the transport vehicle from FIG. 3 in a perspective single representation;

FIG. 10 shows a single partial representation of a belt drive unit of the transport vehicle from FIG. 9; and FIG. 11 shows a side view of the belt drive unit from FIG. 10.

DETAILED DESCRIPTION OF THE PREFERRED EMBODIMENTS

Figure 1:
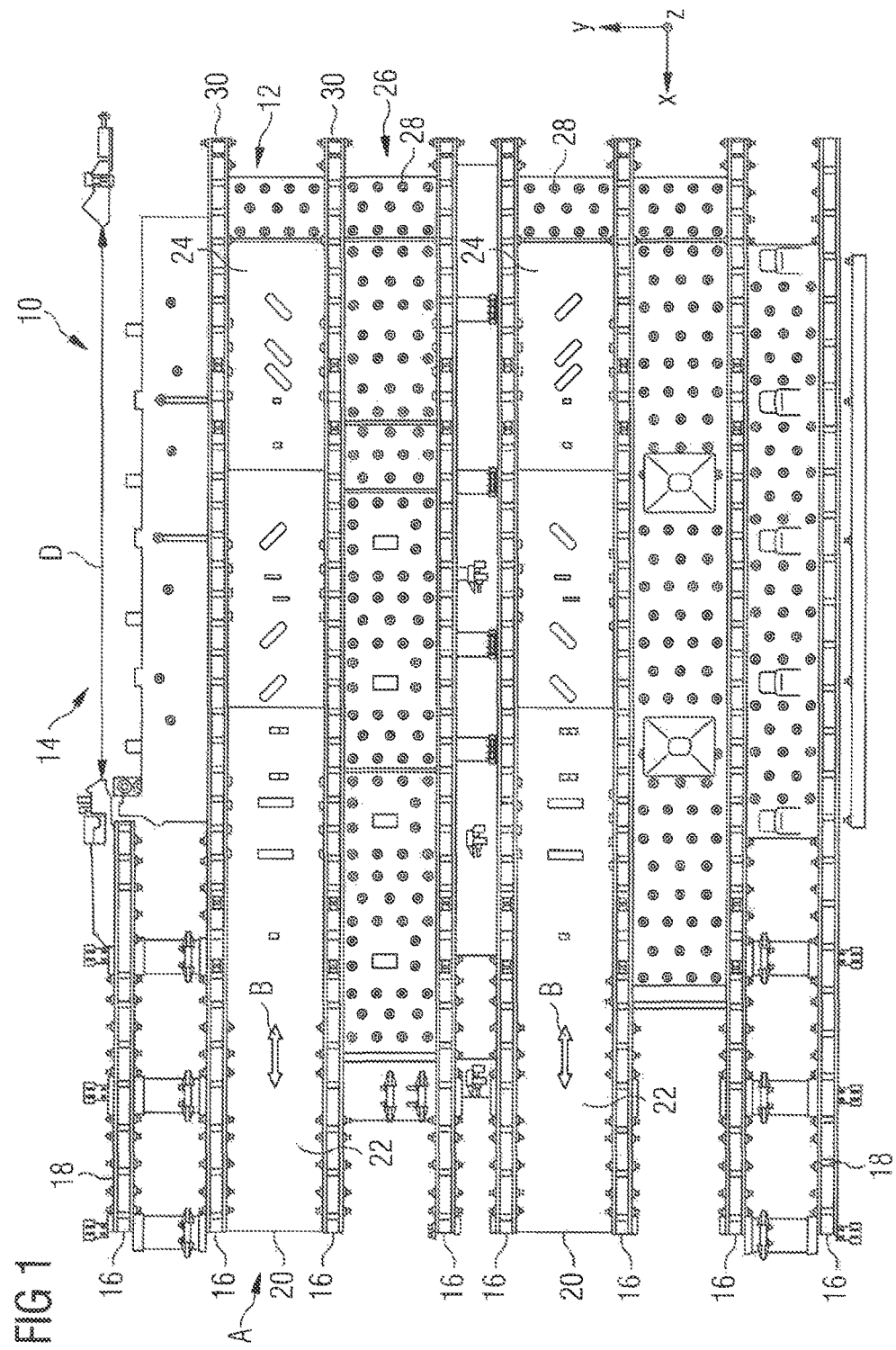
FIG. 1 shows a top view onto the cargo compartment of an aircraft, comprising a system according to the invention for moving loads according to a first embodiment.

FIG. 1 shows a top view onto the cargo compartment of an aircraft, comprising a system according to the invention for moving loads. This system is denoted in the overall by reference numeral 10. The cargo compartment comprises a cargo compartment floor 12, of which only selected structures and components that are particularly relevant for transporting and storing loads are shown in FIG. 1. The cargo compartment furthermore comprises an access region 14, which defines an opening having the width D in the aircraft fuselage and which is accessible from the outside in the known manner via a cargo compartment door of the aircraft, which is not shown.

The cargo compartment comprises multiple roller tracks 16, which each comprise multiple rollers 18. These are arranged one behind the other, as viewed along an X axis of the cargo compartment. For the sake of clarity, only selected rollers 18 are marked in FIG. 1 with a corresponding reference numeral. The X axis of the cargo compartment furthermore extends parallel to an aircraft longitudinal axis, which is not shown.

The rollers 18 each rotate about a rotational axis, which extends perpendicularly to the X axis and parallel to the plane of the cargo compartment floor 12. They furthermore form a shared running surface plane, which forms a locally raised region within the cargo compartment, so that loads can be displaced on the rollers 18 along the X axis parallel to the cargo compartment floor 12.

A guideway 20 is provided between two of the roller tracks 16. In the top view shown in FIG. 1, only the planar bottom surfaces 22 of a base region of the guideways 20 are apparent. These base surfaces 22 are recessed into the drawing plane with respect to the roller tracks 16, and, in particular, with respect to the raised running surfaces of the rollers 18 (which is to say arranged lower in the Z direction of FIG. 1).

The guideways 20 each accommodate a transport vehicle 24, which is displaceable along a movement axis B within the guideways 20, wherein the movement axis B extends parallel to the X axis of the cargo compartment. As will be described hereafter, the transport vehicles 24 are supported on the base surfaces 22 of the guideway 20, so that a movement plane of the transport vehicles extends parallel to the base surfaces 22 and includes the movement axis B. The movement plane of the transport vehicles is moreover parallel to the shared running surface plane of the rollers 18 from the roller tracks 16 and the movement plane of the loads defined thereby.

In FIG. 1, the transport vehicles 24 are each arranged close to the access region 14 to the cargo compartment in the starting positions thereof. In this position, they can only be moved to the left in FIG. 1 to transport loads into regions of the cargo compartment located at a distance from the access region 14. It is apparent in FIG. 1 that a loading region 26 extends between the access region 14 and the roller tracks 16, the loading region comprising multiple ball rollers 28 (only some of which are denoted by a reference numeral) in the known manner (so-called "ball mat area"). When the cargo compartment is being loaded with loads in the form of known ULDs, the ULDs are initially pushed into the cargo compartment via the access region 14 along the Y axis, wherein they glide on the ball rollers 28. Thereafter, the ULDs are transported in the manner described hereafter by way of the transport vehicles 24 along the movement axis B or the X axis of the cargo compartment, wherein the ULDs are moved along the roller tracks 16 and supported by these. In other words, the gravitational forces of the loads are initially borne essentially by the ball rollers 28, and thereafter by the rollers 18 of the roller tracks 16. The described loading operation can be carried out in reverse order for unloading the cargo compartment. Furthermore, the loads can also be moved relative to the vehicles 24 by way of transport devices 60 of the transport vehicles 24 described hereafter and, for example in the loading region 26, be initially rotated about the Z axis.

Figure 2:
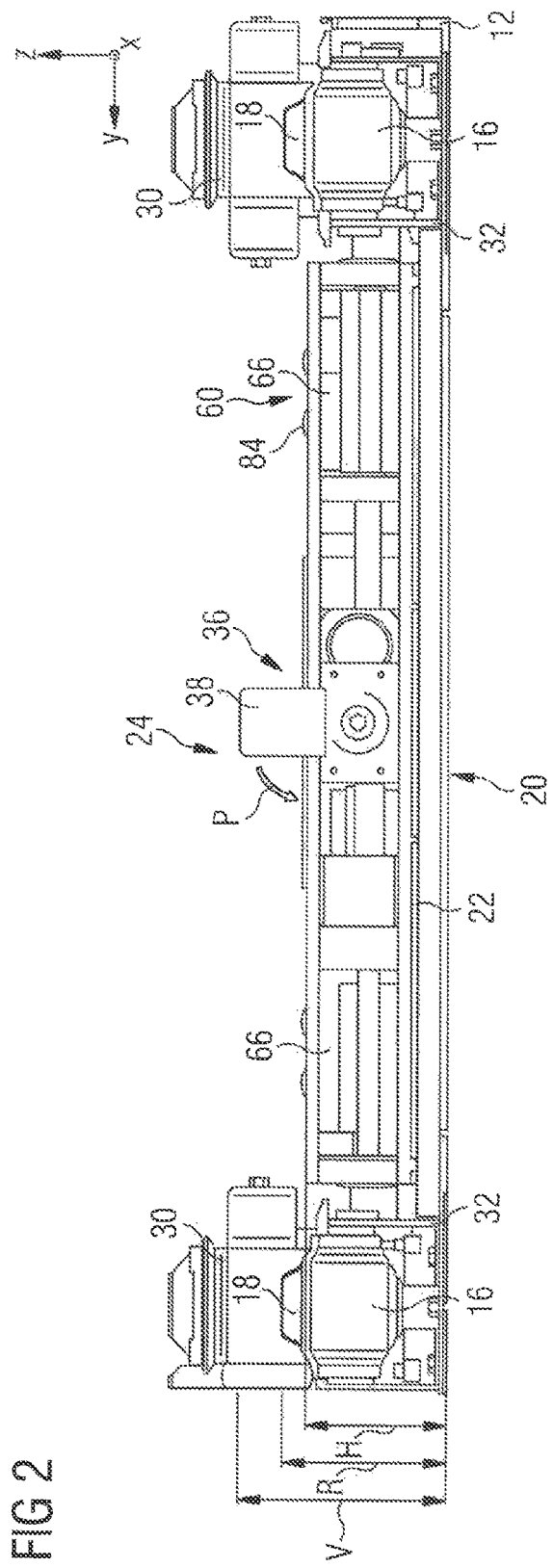
FIG. 2 shows a frontal view of a sub-region of the system shown in FIG. 1.

FIG. 2 shows a frontal view onto a sub-region of the system from FIG. 1, and specifically a frontal view onto a guideway 20 comprising a transport vehicle 24 arranged therein. The view corresponds to a viewing axis A, as indicated in FIG. 1, wherein the illustration in FIG. 2 is accordingly rotated.

The roller tracks 16 comprising the rollers 18 accommodated therein, and the interposed guideway 20 comprising the planar base surfaces 22, are again apparent. It should be noted that the regions 30 protruding the rollers 18 are known structural components of the cargo compartment floor 12, which are located outside the movement path of the transport vehicle 24 and thus are not further relevant for the movement of the load (see corresponding regions 30 in FIG. 1).

It is furthermore apparent from FIG. 2 that the guideway 20 comprises side wall regions 32 that are formed by the roller tracks 16 and laterally delimit the guideway 20. The side wall regions 32 extend perpendicularly to the base surface 22 and parallel to the movement axis B of the transport vehicle 24 or the X axis of the cargo compartment. These axes are each located perpendicularly on the drawing plane in the view from FIG. 2 and are not shown separately.

It is furthermore apparent from FIG. 2 that the transport vehicle 24 is supported by way of rollers 66, which are discussed hereafter, on the base surface 22 of the guideway and moves along the same. The transport vehicle 24, in general, has a lower height H over the cargo compartment floor 12 than the height R of the running surfaces of the rollers 18. In other words, the running surfaces of the rollers 18 protrude beyond the transport vehicle 24, so that a load, in principle, can be arranged on the roller tracks 16 and be borne by these, without being supported on the transport vehicle 24.

As is described hereafter, the transport vehicle 24 also comprises multiple transport devices 60 comprising driven transport rollers 84. For the sake of illustration, the running surfaces of these rollers 84 are shown slightly below the height R of the rollers 18 of the roller tracks 16 in FIG. 2. In fact, however, it is provided that the transport rollers 84 are spring-preloaded and thus extend beyond the height R when unloaded. This allows the transport rollers 84 to be brought to bear against a load positioned on the roller tracks 16 so as to transmit a movement force thereto.

The transport vehicle 24 furthermore comprises a connecting unit 36 including a connecting element 38, which comprises a single plate-shaped connecting section. In the shown case, the connecting element 38 assumes a second operating position in which it extends beyond the further regions of the transport vehicle 24 and of the rollers 18 in a vertical or Z direction. Thus, it assumes a greater height H over the cargo compartment floor 12 than the running surface plane of the roller tracks 16. This allows the connecting element 38 to establish contact with a ULD unit, which is not shown and arranged on the roller tracks 16, or to be supported thereon. A movement of the transport vehicle 24 along the movement path B can thus be transmitted to the ULD unit so as to displace the same on the roller tracks 16 parallel to the cargo compartment floor 12.

As is indicated by the arrow P in FIG. 2, the connecting element 38, however, can likewise be rotated 90° in the direction of the base surface 22 of the guideway 20, wherein the rotation takes place in a plane that extends substantially perpendicularly to the movement plane of the transport vehicle 24. Subsequent to this rotation, the connecting element 38 assumes a first operating position, which is not shown in FIG. 2 and in which it does not extend beyond the running surfaces of the rollers 18, which is to say it takes on a lesser height over the cargo compartment floor 12 than the height R of the rollers 18. This allows the transport vehicle to be arranged beneath a load, or a load to be pushed across the transport vehicle on the ball rollers 28 of the loading region 26 and/or the roller track 16 or to be positioned thereabove. Likewise, the transport vehicle can pass underneath a load in this state. A deliberate contact with a load arranged over the transport vehicle, for moving this load, can only be established again after the connecting element 38 has been selectively moved into the second operating position.

In general, the height H of the transport vehicle 24 over the cargo compartment floor 12, or based on the base surface 22 of the guideway 20, can be approximately 30 to 60 mm, and preferably approximately 50 mm. This applies, in particular, to a case in which the connecting element 38 is arranged in the first operating position and ensures a sufficient distance from a load arranged over the transport vehicle 24.

Figure 3:
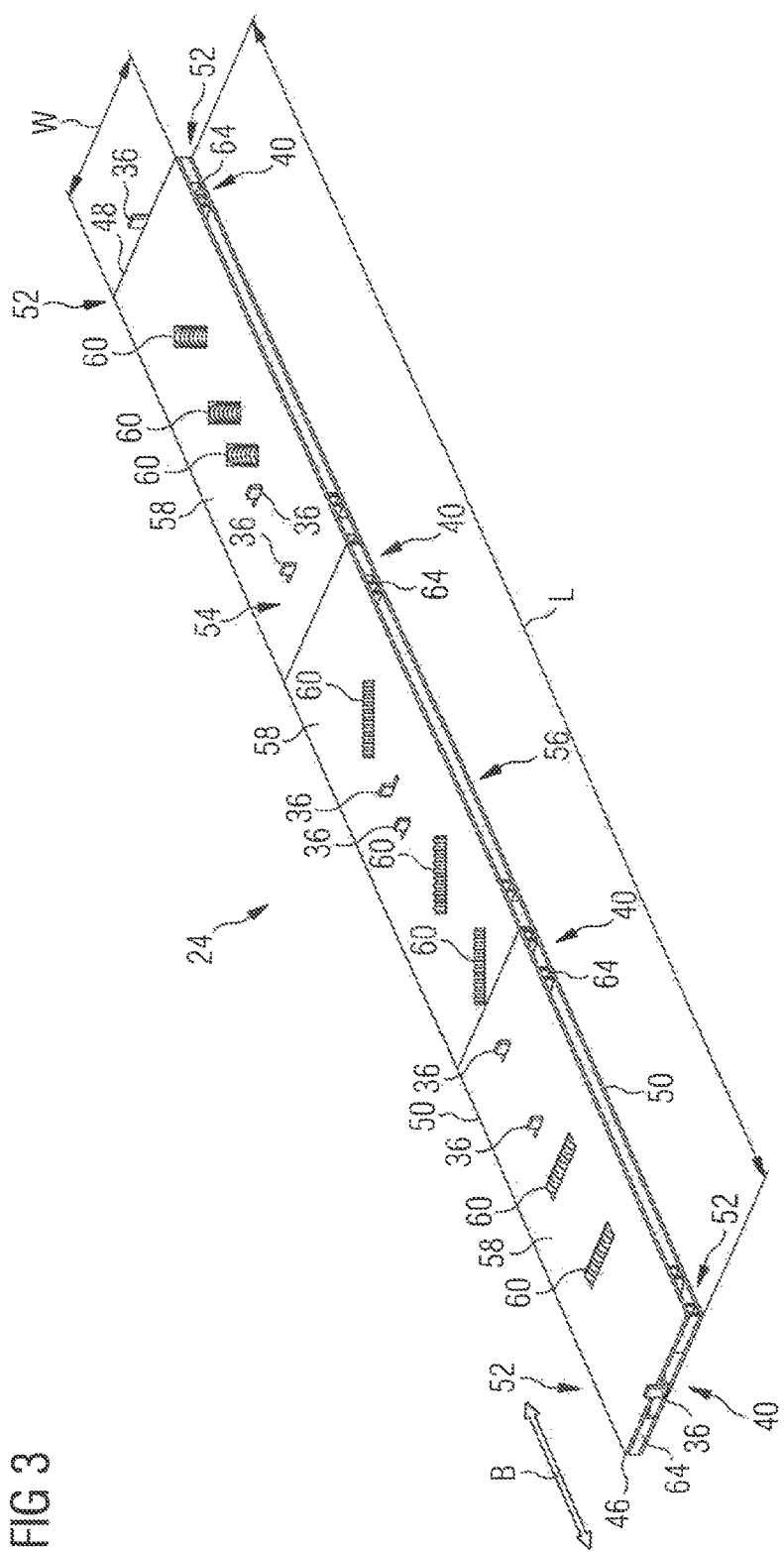
FIG. 3 shows a transport vehicle for use in the system from FIG. 1 in a perspective single representation.
Figure 4:
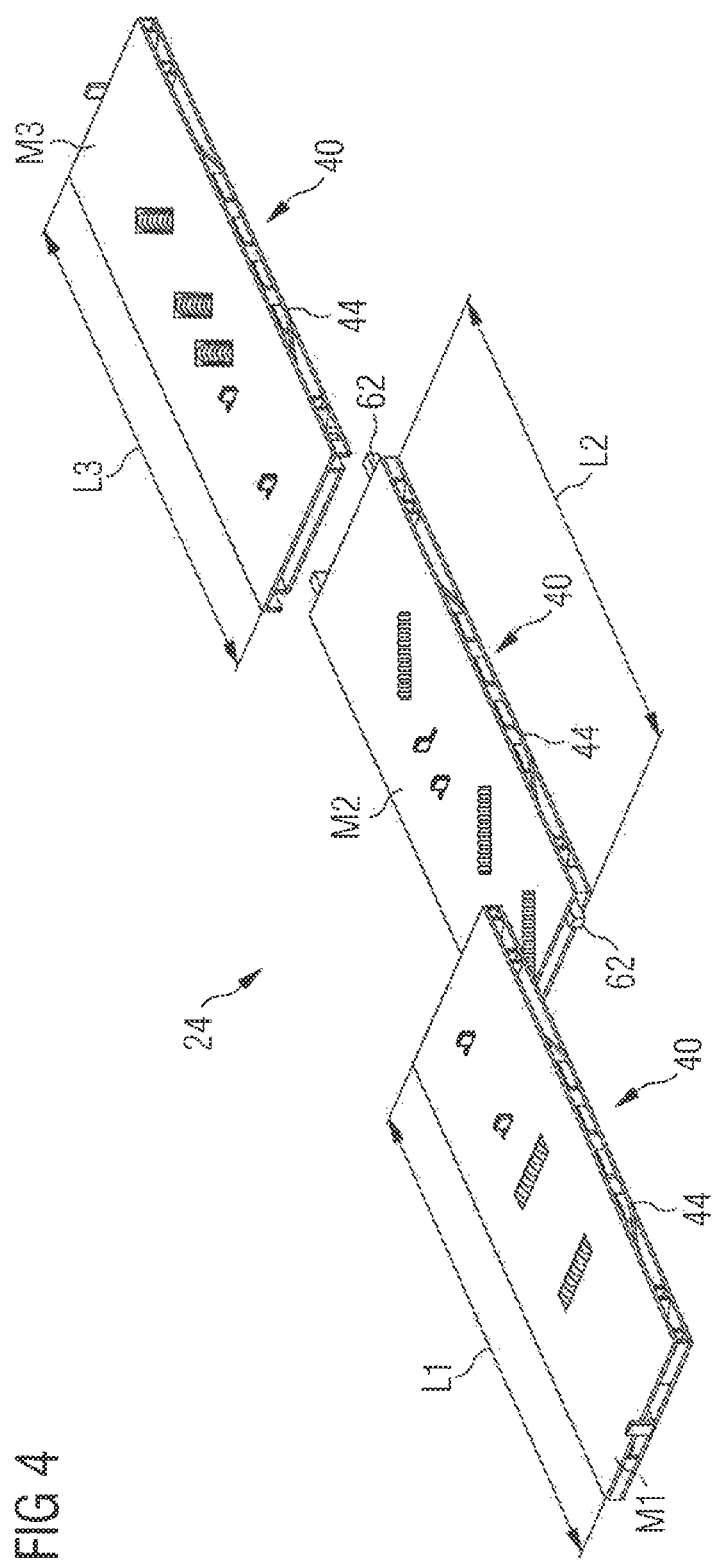
FIG. 4 shows a modular design of a transport vehicle according to the invention.

FIGS. 3 and 4 show a transport vehicle 24 for use in the above-described system 10 in a perspective single partial representation. As will be described hereafter, the transport vehicles from FIGS. 3 and 4 differ only with respect to the drive mechanisms 40 thereof, which, in the case of FIG. 3, comprises multiple driven drive rollers 64, and, in the case of FIG. 4, comprises multiple belt drives 44. FIGS. 1 and 2 each show a transport vehicle 24 comprising a belt drive 44 according to FIG. 4. However, it would also be possible to use the transport vehicle comprising the drive rollers 64 from FIG. 3.

The transport vehicle 24 from FIG. 3, in general, is flat and elongated and has a considerably greater length L than width W. In the shown case, the length L is approximately 3200 mm and the width W is approximately 420 mm. This allows all common ULD sizes to be transported reliably and quickly, and in particular, it allows multiple ULD units to be transported simultaneously. In general, the length L can be approximately 3 to 10 times as large as the width W, and, preferably, approximately 5 to 8 times. The length L can furthermore, in general, be greater than the width D of the access region 14 to the cargo compartment shown in FIG. 1. The length L furthermore extends parallel to the movement axis B of the transport vehicle 24 and along the side regions 50 thereof, which are described hereafter.

In general, the transport vehicle 24 comprises a front region 46 and a rear region 48, which, in general, extend transversely to the movement axis B and extend between the side wall regions 32 of the guideway 20 (see FIG. 2). The front and rear regions 46, 48 are connected to one another via two opposing side regions 50. In respective corner regions 52, these side regions 50 transition into the front and rear regions 46, 48 and, in general, extend parallel to the side wall region 32 of the guideway 20.

The transport vehicle 24 furthermore comprises an upper face 54, which faces a load arranged over the transport vehicle 24. Likewise, it comprises a lower face 56 which faces away from the upper face 54 and faces the base surface 22 of the guideway 20. On the upper face 54, the transport vehicle 24 comprises substantially closed cladding panels 58, which, in particular, are intended to prevent dirt from penetrating. The lower face 56, in contrast, is open at least so much that a contact can be established between the drive rollers 64 and the base surface 22 of the guideway 20. The side regions 50, in contrast, are not clad separately and substantially open. The transport vehicle 24 furthermore comprises a frame system, which is not shown in detail, so as to mount the individual components of the transport vehicle 24 thereon and position these relative to one another.

It is apparent from FIG. 3 that the transport vehicle 24 furthermore comprises multiple connecting units 36, which are distributed along the length L. The exact positions of the connecting units 36 are selected in such a way that individual or multiple standardized ULD units can be arranged as desired on the transport vehicle 24 and connected via the above-described connecting elements 38 of the connecting units 36. In the shown case, all connecting elements 38 are in the second operating position in which they enable a connection to a ULD unit, which is not shown, so as to transport the same along the movement axis B.

It is furthermore apparent from FIG. 3 that the transport vehicle 24 comprises multiple roller-shaped transport devices 60 on the upper face 54 thereof, so as to move a load arranged over the transport vehicle 24 as desired relative to the transport vehicle 24. This will be described in greater detail hereafter.

FIG. 4 shows a transport vehicle 24 that is substantially identical to the variant according to FIG. 3, with the exception of the above-mentioned difference regarding the drive mechanism 40. The modular design of the transport vehicle 24, which is also provided in the variant from FIG. 3, is apparent from the illustration according to FIG. 4. Specifically, the transport vehicle 24 comprises three individual modules M1, M2 and M3, which have identical lengths L1, L2 and L3 of approximately 1000 to 1050 mm. The individual modules M1, M2 and M3 can be coupled to and detached from one another via coupling mechanisms 62, which are not shown in detail, whereby simplified handling of the transport vehicle 24 is ensured.

Figure 5:
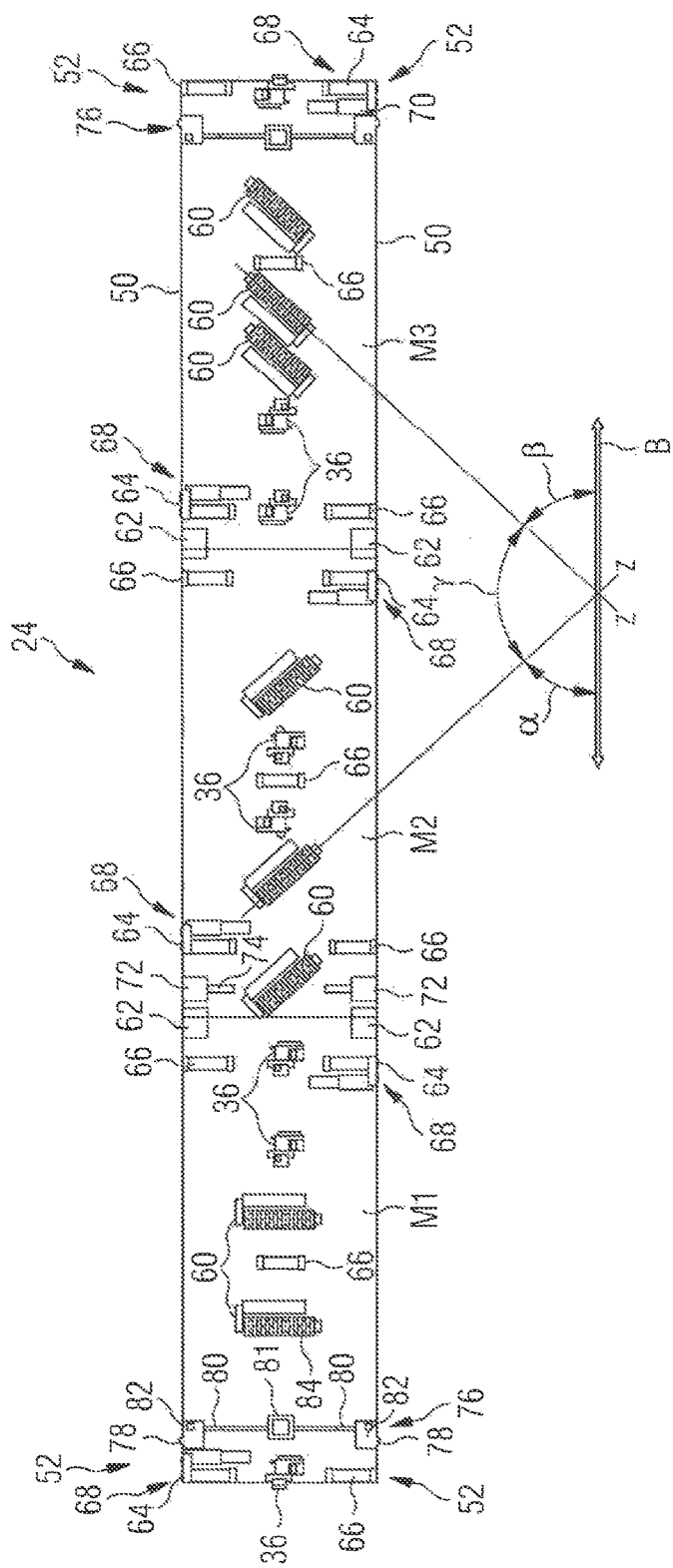
FIG. 5 shows a schematic illustration of the individual integral parts of the transport vehicle from FIG. 3.

FIG. 5 shows a schematic top view onto the transport vehicle 24 from FIG. 3 to describe the structure and individual components thereof in greater detail. Insignificant details, such as the frame system, possible connecting lines and cables or the cladding panels 58, have been omitted. Initially, the above-described connecting units 36 are apparent, which are distributed along the transport vehicle 24. Also apparent are the individual modules M1, M2 and M3, which are coupled to one another via coupling mechanisms 62. Furthermore, multiple rollers 64, 66 are apparent, which are each arranged close to the side regions 50 or in the corner regions 52 of the transport vehicle 24. Likewise, individual roller 66 are arranged centrally within the individual modules M1, M2 and M3. The rollers 64, 66 are arranged in the region of the lower face 56 of the transport vehicle 24 and are thus in contact with the base surface 22 of the guideway 20 when the transport vehicle 24 moves along the movement axis B.

In detail, the rollers 66 are non-driven rollers, which during a movement of the transport vehicle 24 only run along and are used to achieve a better load introduction and distribution on the guideway 20. The rollers 64, in contrast, form an integral part of multiple individual modular drive units 68, which are distributed along the transport vehicle 24, and which are an integral part of the drive mechanism 40 so as to move the transport vehicle 24 along the movement axis B. Specifically, the rollers 64 form drive rollers, which are each driven by an electric motor 70 so as to achieve the desired locomotion. For the sake of illustration, only one of the electric motors 70 is denoted by the appropriate reference numeral in FIG. 5 (see drive unit 68 in the bottom right corner region 52). It is apparent that the individual drive units 68 for each individual module M1, M2, M3 are arranged in diagonally opposing corner regions, wherein the corner regions of the individual modules not marked separately in FIG. 5 either agree with the corner regions 52 of the overall vehicle 24 or are arranged close to the coupling mechanisms 62.

Furthermore, the above-described transport devices 60 are apparent in FIG. 5, which are arranged in the region of the upper face 54 of the transport vehicle 24. As will be described hereafter, the transport devices 60 each comprise a driven omnidirectional transport roller 84, which rotates about a rotational axis Z (for the sake of illustration, only the transport roller 84 arranged farthest to the left in FIG. 5 is denoted by an appropriate reference numeral).

In detail, the left individual module M1 in FIG. 5 comprises transport devices 60 in which each of the transport rollers 84 rotates about the rotational axis Z extending perpendicularly to the movement axis B. This allows, in particular, a load transport relative to the transport vehicle 24 along the movement axis B. The individual modules M2 and M3, in contrast, each comprise three transport devices 60, the transport rollers 84 of which each rotate about rotational axes Z extending obliquely to the movement axis B. This makes it possible both to rotate loads about the Z axis shown in FIG. 1 and to transport these along the movement axis B and transversely thereto.

As is schematically indicated in FIG. 5, the rotational axes Z of the transport rollers 84 of the individual module M2 are inclined with respect to the movement axis B by an angle a of +45° (seen clockwise). The rotational axes Z of the transport rollers 84 of the individual module M3, in contrast, are inclined with respect to the movement axis B by an angle b of −45°. In other words, the rotational axes Z of the respective transport rollers 84 of the individual modules M2 and M3 intersect one another and the movement axis B. Accordingly, these rotational axes Z enclose a shared angle g of 90°.

The transport vehicle 24 furthermore comprises locking mechanisms 72, which are arranged on both sides in the side regions 50 and can be selectively activated so as to lock the transport vehicle 24 in the guideway 20. This can be relevant, for example, when the transport vehicle 24 is to remain in the cargo compartment during flights. For this purpose, each of the locking mechanisms 72 comprises a pin 74, which can be extended in the direction of the opposite side wall region 32 of the guideway 20 so as to engage there in a corresponding receiving structure and lock the vehicle 24 in the starting position shown in FIG. 1.

Finally, the transport vehicle 24 from FIG. 5 comprises a respective preload mechanism 76 near the front and rear regions 46, 48. These have identical designs, wherein, for the sake of illustration, only the further reference numerals for the preload mechanism 76 shown on the left in FIG. 5 are shown. The preload mechanism comprises two guide rollers 78, which are arranged opposite one another and protrude beyond the respective side regions 50 of the transport vehicle 24 so as to bear against the side wall region 32 of the guideway 20. In this way, they can ensure a desired orientation of the transport vehicle 24 and guide this in a rectilinear manner along the movement axis B. For this purpose, the guide rollers 78 are each connected to spindle nuts 82, which are arranged on threaded spindles 80. The threaded spindles 80, which are assigned to the respective guide rollers 78, are furthermore connected to one another via a universal joint 81. By rotating the spindle nuts 82 and/or the threaded spindle 80, a translatory movement of the guide rollers 78 can thus be generated in the known manner along an axis extending perpendicularly to the movement axis B. In this way, an appropriate preload force can be applied to the guideway 20 or the opposite side wall regions 32.

FIG. 6 shows a transport device 60 of the transport vehicle 24 in a perspective single partial representation. The driven transport roller 84 is apparent, which is designed as an omnidirectional roller in the known manner. Furthermore, the rotational axis Z is illustrated, about which the transport roller 84 rotates. For this purpose, the transport devices 60 furthermore comprise an electric motor 86, which is coupled via a belt drive 88 to the transport roller 84. The electric motor comprises an output shaft, which is not shown separately, which drives the belt drive 88 and rotates about an axis A extending substantially parallel to the rotational axis Z. This allows the transport rollers 84 and electric motor 86 to be arranged next to one another or in a common plane in a space-saving manner. As is apparent from FIG. 3, the transport devices 60 are arranged in such a way that only the transport roller 84 on the upper face 54 of the transport vehicle 24 protrudes beyond the cladding panels 58.

FIG. 7 shows a connecting unit 36 in a perspective single partial representation. It is apparent that the connecting unit 36 likewise comprises an electric motor 90 and a belt drive 92, which is coupled to a coupling shaft (not shown) of the coupling element 38. In this way, the above-described pivoting movement of the connecting element 38 between the first and second operating positions along the arrow P can be generated.

FIG. 8 shows a drive unit 68 of the drive mechanism 40 in a perspective single partial representation. Again, the drive roller 64 is apparent, which is driven by an electric motor 70. The electric motor 70 and the drive roller 64 are coupled to one another via a belt drive 94 for this purpose. The drive roller 64 rotates about a rotational axis K, which, in general, extends parallel to a rotational axis J of an output shaft (not shown separately) of the electric motor 70. As is apparent from the slightly oblique progression of the belt drive 94, the drive roller 64 is offset only slightly with respect to the electric motor 70 in the direction of the base surface 22 (not shown) of the guideway 20, so that the drive unit 64 overall has a particularly flat and space-saving design.

Coming back to FIG. 1, the operation of the system 10 according to the invention will be briefly described. Initially, the connecting elements 36 of the transport vehicles 24 are in the first operating position. After a ULD unit has been transported across the access region 14 and the ball rollers 28 of the loading region 26 in the Y direction and arranged above the transport vehicles 24, the connecting elements 36 are moved into the second operating position. In this way, they establish contact with the ULD units. Optionally, it is also possible to activate the transport devices 60 first so as to move the ULD units along the transport vehicle 24 or rotate these relative thereto.

In general, different ULD units can be arranged in each case above the transport vehicles 24. Likewise, it is possible to position an appropriately sized ULD unit simultaneously over both transport vehicles 24 and couple these thereto via the respective connecting elements 36.

In any case, the transport vehicles 24 are moved along the movement axis B to the left in FIG. 1, after the connecting elements 36 have been moved into the first operating position. In this way, the ULD units are moved by the ball rollers 28 onto the roller tracks 16 and into regions of the cargo compartment located further away. After a target position has been reached, the connecting elements 36 are moved into the first operating position again, whereby the transport vehicles 24 are uncoupled from the ULD units. During a subsequent return movement of the transport vehicles 24 into the starting position shown in FIG. 1, the ULD units thus remain in the target positions thereof within the cargo compartment, without following the movement of the transport vehicles 24. Subsequently, further loads can be moved within the cargo compartment in the same manner. The described steps are carried out in the reverse order to unload the cargo compartment.

Likewise, however, it is possible to rotate a load arranged over the transport vehicles 24 about the vertically extending Z axis at any arbitrary time by way of the transport devices 60. This can take place, in particular, after the load has already been partially transported along the movement axis B, for example so as to take variable cross-sectional dimensions of the cargo compartment into account.

The rotation of the load is carried out in the generally known manner by way of a coordinated rotation of the omnidirectional transport rollers 84. Such systems are known from loading vehicles, for example, which operate outside the aircraft and move ULD units via the access region 14 into the cargo compartment. However, the inventors recognized that the above-described special arrangement of the transport rollers 84 on the transport vehicle 24, and, in particular, the intersecting thereof with respect to one another and with respect to the movement axis B, allows frictional losses within the transport rollers 84 to be drastically reduced. In the shown case, in particular, the transport rollers 84 of the individual modules M2 and M3 serve as corresponding "rotating devices." These rollers 84 likewise, however, allow the loads to be moved in the X-Y plane. The transport rollers 84 of the first module M1 rotating transversely to the movement axis B instead are used, in particular, for a translatory displacement of the loads along the movement axis B.

Figure 9:
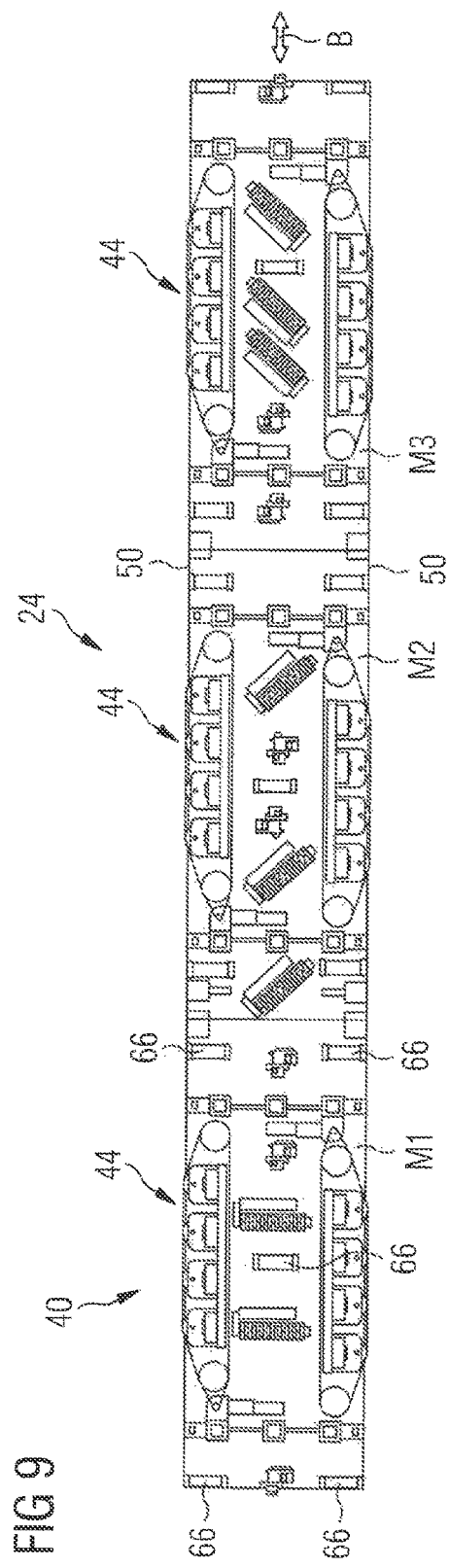
FIG. 9 shows a schematic illustration of the individual integral parts of a transport vehicle according to a further embodiment of the invention.

FIG. 9 shows the transport vehicle 24 according to the variant from FIG. 4 in an analogous illustration to FIG. 5. Like or like-acting features are accordingly denoted by like reference numerals. As was already mentioned, this transport vehicle 24 essentially only differs with respect to the drive mechanism 40, which in this case comprises a drive unit in the form of a belt drive 44 for each individual module M1, M2, M3. The transport devices 60, the connecting units 36, the coupling mechanisms 62, and the locking mechanisms 72, in contrast, are designed identically to the variant according to FIG. 5, and will therefore not be described separately hereafter.

It is apparent that the transport vehicle 24 again comprises multiple rollers 66 on the lower face 56 thereof for supporting on a base surface 22 of the guideway 20. These, however, are exclusively designed as non-driven rollers 66 that run along, wherein, for the sake of illustration, only the rollers 66 of the first module M1 are denoted by appropriate reference numerals. In principle, however, it is also conceivable to design individual of these rollers 66 as driven rollers 64, as was described with reference to FIG. 5.

In this variant, the transport vehicle 24 is instead driven by the belt drives 44, of which one is shown in FIG. 10 in a single partial representation. It is apparent that the belt drive 44 comprise two drive belts 100, which protrude beyond the side regions 50 of the transport vehicles and, analogously to the guide rollers 78 of the variant from FIG. 5, can be brought to bear against a side wall region 32 of the guideway 20. In this way, frictional contact can be established with the corresponding opposite side wall region 32. During a movement of the drive belts 100 relative to the generally stationary side wall region 32, this can be implemented in the known manner in an advancement movement of the transport vehicle 24 along the movement axis B. In the example from FIG. 10, a revolving rotation of the drive belts 100 takes place in the marked direction U, which during a contact with the side wall regions 32, results in a movement of the transport vehicle 24 to the right in FIG. 9.

The drive belts 100 each run in the known manner over a guide roller 102 and a drive roller 104, which are driven in a rotatory fashion by an electric motor 106. Furthermore, multiple tension rollers 108 are provided, so as to apply a sufficient preloading force onto the drive belts 100. A corresponding unit composed of a drive belt 100, drive and guide rollers 102, 104, tension rollers 108 and an electric motor 106 is arranged on a respective carrier 112.

The belt drive 44 furthermore comprises a preload mechanism 76, which is arranged on either side of the drive belts 100, as viewed along the movement axis B. Each preload mechanism 76 comprises again two threaded spindles 80, which are connected to one another via a universal joint 81. Each of the threaded spindles 80 is connected to an end region 110 of the carriers 112 acting as a spindle nut. A rotation of the threaded spindles 80 can thus be converted in the known manner into a translatory movement of the carriers 112 and the elements arranged thereon transversely to the movement axis B. In this way, sufficiently tight bearing of the drive belts 100 against the side wall regions 32 of the guideway 20 can be ensured.

Finally, FIG. 11 shows a side view of the belt drive 44 along the viewing axis H from FIG. 10. Again, the drive belt 100, which can be brought to bear against a side wall region 32, and the drive and guide rollers 104, 102 are apparent. The end regions 110 of the carrier 112 acting as spindle nuts are likewise apparent.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for moving loads, comprising:
   a cargo compartment floor;
   at least one roller track comprising a plurality of rollers arranged one behind the other in the cargo compartment floor;
   at least one guideway provided in the cargo compartment floor and extending substantially parallel to the at least one roller track; and
   at least one transport vehicle removably accommodated in the guideway and being movable along the guideway, and comprising at least one connecting element movable between a first operating position and a second operating position,
      in the first operating position, the connecting element being arranged in such a way that the transport vehicle accommodated in the guideway is positionable beneath a load arranged on the at least one roller track, and
      in the second operating position, the connecting element being arranged so as to interact with the load in order to connect the load to the transport vehicle, so that the load is entrained when the transport vehicle moves along the guideway, and
      the transport vehicle further comprising a drive mechanism to move the transport vehicle along the guideway;
   wherein the drive mechanism comprises:
      an electric motor, wherein the electric motor obtains current from a rechargeable battery;
      at least one driven drive roller, which interacts with a base region of the guideway,
      wherein the drive roller is an integral part of a drive unit of the drive mechanism, and the drive unit further comprises an electric motor driving the drive roller,
      wherein the electric motor comprises an output shaft, and a rotational axis of the output shaft and a rotational axis of the drive roller extend substantially parallel to one another.

2. The system according to claim 1, wherein the transport vehicle comprises at least two drive units arranged on opposite sides of the transport vehicle and arranged in diagonally opposing corner regions of the transport vehicle.

3. The system according to claim 1, wherein the transport vehicle comprises at least one non-driven roller which interacts with a base region of the guideway.

4. The system according to claim 1, wherein the transport vehicle further comprises at least one guide roller configured to interact with a side wall region of the guideway, and the transport vehicle comprises at least two guide rollers arranged on opposite sides of the transport vehicle.

5. The system according to claim 1, wherein the transport vehicle comprises at least one transport device designed to move a load positioned over the transport vehicle relative to the transport vehicle.

6. The system according to claim 5, wherein the transport device is configured to at least one of move the load essentially along a movement axis of the transport vehicle and rotate the load relative to the transport vehicle.

7. The system according to claim 5, wherein the transport device comprises at least one driven transport roller which comprises an omnidirectional roller.

8. The system according to claim 7, wherein the transport roller is drivable to rotate about a rotational axis that extends at an angle to the movement axis of the transport vehicle.

9. The system according to claim 1, wherein the transport vehicle comprises individual modules that can be separated from one another, and each individual module comprises the drive mechanism wherein the drive mechanism comprises an electric motor and wherein the electric motor obtains current from a rechargeable battery.

10. The system according to claim 1, wherein the transport vehicle comprises individual modules that can be separated from one another, and each individual module comprises at least one non-driven roller which interacts with a base region of the guideway.

11. The system according to claim 1, wherein the transport vehicle comprises individual modules that can be separated from one another, and each individual module comprises at least one guide roller configured to interact with a side wall region of the guideway, and the transport vehicle comprises at least two guide rollers arranged on opposite sides of the transport vehicle.

12. The system according to claim 1, wherein the transport vehicle comprises individual modules that can be separated from one another, and each individual module comprises at least one transport device designed to move a load positioned over the transport vehicle relative to the transport vehicle.

13. A cargo compartment comprising a system for moving loads according to claim 1.

14. A system for moving loads, comprising:
   a cargo compartment floor;
   at least one roller track comprising a plurality of rollers arranged one behind the other in the cargo compartment floor;
   at least one guideway provided in the cargo compartment floor and extending substantially parallel to the at least one roller track; and
   at least one transport vehicle removably accommodated in the guideway and being movable along the guideway, and comprising at least one connecting element movable between a first operating position and a second operating position,
      in the first operating position, the connecting element being arranged in such a way that the transport vehicle accommodated in the guideway is positionable beneath a load arranged on the at least one roller track, and
      in the second operating position, the connecting element being arranged so as to interact with the load in order to connect the load to the transport vehicle, so that the load is entrained when the transport vehicle moves along the guideway, and
      the transport vehicle further comprising a drive mechanism to move the transport vehicle along the guideway;
   wherein the drive mechanism comprises:
      an electric motor, wherein the electric motor obtains current from a rechargeable battery;
      at least one driven drive roller, which interacts with a base region of the guideway,
      wherein the drive roller is an integral part of a drive unit of the drive mechanism, and the drive unit further comprises an electric motor driving the drive roller, wherein the electric motor and the drive roller are coupled to one another via a belt drive.

15. A system for moving loads, comprising:

a cargo compartment floor;

at least one roller track comprising a plurality of rollers arranged one behind the other in the cargo compartment floor;

at least one guideway provided in the cargo compartment floor and extending substantially parallel to the at least one roller track; and at least one transport vehicle removably accommodated in the guideway and being movable along the guideway, and comprising at least one connecting element movable between a first operating position and a second operating position;

in the first operating position, the connecting element being arranged in such a way that the transport vehicle accommodated in the guideway is positionable beneath a load arranged on the at least one roller track, and in the second operating position, the connecting element being arranged so as to interact with the load in order to connect the load to the transport vehicle, so that the load is entrained when the transport vehicle moves along the guideway, and the transport vehicle further comprising a drive mechanism to move the transport vehicle along the guideway;

wherein the drive mechanism comprises:

an electric motor, wherein the electric motor obtains current from a rechargeable battery; and a belt drive protruding beyond a side region of the transport vehicle bearing against a side wall region of the guideway.

* * * * *